United States Patent
Kalfas

(10) Patent No.: US 9,264,677 B2
(45) Date of Patent: Feb. 16, 2016

(54) CAMERA SYSTEM FOR HAZARDOUS ENVIRONMENTS

(71) Applicant: Remote Ocean Systems, Inc., San Diego, CA (US)

(72) Inventor: Nicholas Kalfas, San Diego, CA (US)

(73) Assignee: Remote Ocean Systems, Inc., San Diego, CA (US)

( * ) Notice: Subject to any disclaimer, the term of this patent is extended or adjusted under 35 U.S.C. 154(b) by 494 days.

(21) Appl. No.: 13/750,598

(22) Filed: Jan. 25, 2013

(65) Prior Publication Data

US 2013/0188036 A1 Jul. 25, 2013

Related U.S. Application Data

(60) Provisional application No. 61/590,525, filed on Jan. 25, 2012.

(51) Int. Cl.
 *H04N 7/18* (2006.01)
 *H04N 9/04* (2006.01)
 *G21C 17/003* (2006.01)
 *G21C 19/20* (2006.01)

(52) U.S. Cl.
 CPC .............. *H04N 9/045* (2013.01); *G21C 17/003* (2013.01); *G21C 19/207* (2013.01); *H04N 7/185* (2013.01)

(58) Field of Classification Search
 CPC . H04N 2005/2255; H04N 7/183; H04N 7/18; H04N 5/2252; H04N 7/185; H04N 17/002; H04N 17/00; G06T 7/0018; G06T 7/0004; G06T 7/001
 USPC ........... 348/65, 81, 82, 61, 73, 175, 180, 187, 348/184, 185, 169, 83; 382/141, 144–149
 IPC ........................ H04N 7/18,5/225, 17/00, 17/02
 See application file for complete search history.

(56) References Cited

U.S. PATENT DOCUMENTS

| | | | |
|---|---|---|---|
| 8,018,514 B1 | 9/2011 | Baiko et al. | |
| 8,054,337 B2 | 11/2011 | Kyoung | |
| 8,717,433 B2 * | 5/2014 | Ockerse | ........................ 348/135 |
| 2007/0146480 A1 | 6/2007 | Judge et al. | |
| 2009/0096894 A1 | 4/2009 | Amling et al. | |
| 2011/0211061 A1 | 9/2011 | Kossin et al. | |
| 2012/0133750 A1 | 5/2012 | Talbert et al. | |

FOREIGN PATENT DOCUMENTS

WO    WO 2011150122 A2 * 12/2011

OTHER PUBLICATIONS

PCT/US2013/023253 International Search Report and Written Opinion, May 9, 2013, 10 pages.

* cited by examiner

*Primary Examiner* — Sherrie Hsia
(74) *Attorney, Agent, or Firm* — Eleanor Musick; Greer, Burns & Crain Ltd

(57) ABSTRACT

A camera system is provided for use in a high-radiation environment includes a camera assembly with a housing enclosing an image sensor for generating a digital signal of a detected image and a first serializer/deserializer (SERDES) for converting the digital signal from the image sensor into a serial bit stream. A transmission medium transmits the serial bit stream to an image processing module located outside of the high-radiation environment where a second SERDES deserializes the serial bit stream to generate a decoded image signal which is processed by an image processor to generate an output at a display device corresponding to the detected image.

25 Claims, 4 Drawing Sheets

CAMERA SYSTEM FOR HAZARDOUS ENVIRONMENTS

RELATED APPLICATIONS

This application claims the benefit of priority of U.S. Provisional Application No. 61/590,525, filed Jan. 25, 2012, which is incorporated herein by reference in its entirety.

FIELD OF THE INVENTION

The invention relates generally to industrial video cameras, and more particularly to industrial video cameras for nuclear power plant monitoring and other applications that require radiation hardening.

BACKGROUND OF THE INVENTION

Nuclear plant operators and service companies perform in vessel visual inspections (IVVI) in conjunction with reactor refueling operations to inspect reactor components for flaws or damage to the reactor vessel and components within the reactor including submerged pipes and bores. For example, a reactor pressure vessel (RPV) of a boiling water reactor (BWR) typically has submerged bores that need to be inspected during maintenance routines. Hollow tubular jet pumps having internal bores are positioned within an annulus to provide the required reactor core water flow. During operation of the reactor, components including their weld joints within the reactor can experience inter-granular stress corrosion cracking (IGSCC) and irradiation assisted stress corrosion cracking (IASCC) which can diminish the structural integrity of the reactor components, such as jet pumps, by way of example. It is important to periodically examine the reactor core components and all welds contained therein to determine whether any cracking or failure has occurred.

The ability to accurately and quickly perform the IVVI visual inspections can impact the outage associated with the nuclear reactor. Thus, improvements to the accuracy and speed with which visual inspections can be performed can reduce the outage period and save the nuclear plant operator significant expense.

A visual inspection system typically includes one or more cameras positioned on a remotely operated vehicle that can be moved to various locations within the reactor vessel. Each camera is coupled to a video transmission system that provides an image signal to a remotely located visual display device or storage system. These visual systems are used to inspect the reactor components for damage and/or to look for debris that may have accumulated in the reactor. A number of cameras are used for various tasks including inspections of the outer surface of pipes and inner bores of pipes, apertures and bores. Generally, each visual inspection system (camera, transmission system, and display) is required to meet pre-defined imaging standards to ensure that the visual inspection is capable of identifying and delineating the necessary specificity in flaw and damage identification. The requirements for IVVI visual inspection systems include visual Testing (VT) standards such as a rigorous EVT-1 standard, by way of example. The EVT-1 standard provides that the imaging system be capable of resolving a 0.0005" (½ mil) wire on an 18 percent neutral gray background. The EVT-1 standard as well as other known visual inspection standards rely on personal evaluation by an operator to ensure that the imaging system is providing the appropriate image quality to the remote display from which the inspection is performed. Any inconsistencies can result in the failure of the visual inspection system in providing an image for viewing in which the operator can identify a potential flaw or damage which can result in failure to identify such, or can require re-inspection, and therefore added time and costs for the IVVI inspection.

Several systems have been developed for performing IVVI inspection. An example of currently available systems is the Diakont D40 Camera (Diakont Advanced Technologies, San Diego, Calif.), which is considered to be state-of-the-art for visual inspection. This system uses a tube sensor that generates a monochrome image that is converted to color through the use of colored LEDs, which are used to illuminate the area under inspection in a rapid sequence. A computer program uses the colors to convert the monochrome image into color. Even though the sequencing of the colored LEDs is rapid, the cycling of the LEDs, along with the processing time, results in delays that may be manifested as blurred images when the camera is moved. This can be problematic when resolution is important for identifying small defects. Further, the use of a tube limits the size of the camera, preventing the miniaturization needed for close inspection in tightly spaced structures.

Another drawback of existing systems is that the camera sensor, whether tube or solid state (e.g., CCD, CID, CMOS), produces an analog signal that is communicated to the image processing system. The use of analog signals presents a disadvantage since the signal must be digitized within the processor, often requiring additional processing to interpret the image using statistical methods. While many such techniques can produce good results, the additional processing can produce delays that extend the time required for accurate inspection.

Accordingly, the need remains for a radiation-hardened camera that can be used for high resolution visual inspection of high radiation environments such as nuclear reactors.

SUMMARY OF THE INVENTION

In an exemplary embodiment, a camera for visual inspection comprises a sensor for producing a digital signal corresponding to detected images, where the camera is disposed within a housing along with appropriate driver electronics and a serializer-deserializer (SERDES) encoder/decoder. The SERDES converts the signal from the sensor into a high frequency bit stream which is communicated through an appropriate connector to a high frequency cable, e.g., a microwave cable, to a processing module in which a second SERDES receives the high frequency signal and resolves the incoming bit stream into a digital bit stream for processing of the image. The use of a SERDES encoder/decoder pair, one at the sensor and one at the processing module permits high speed transmission of data from the sensor to the processing module and control commands from the processing module to the sensor.

In one aspect of the invention, a camera system is provided for use in a high-radiation environment, where the camera system includes a camera assembly comprising a housing, an image sensor disposed within the housing, the image sensor adapted for generating a digital signal corresponding to a detected image of an object, and a first serializer/deserializer (SERDES) disposed within the housing for converting the signal from the image sensor into a serial bit stream; a transmission medium for transmitting the serial bit stream; and an image processing module disposed outside of the high-radiation environment for receiving the transmitted serial bit stream, the image processing module comprising a second SERDES adapted for deserializing the serial bit stream to generate a decoded image signal; and an image processor adapted to process the decoded image signal to generate an output at a display device corresponding to the detected image. In one embodiment, the housing includes a seal for enclosing the image sensor and the first SERDES within a watertight enclosure. The housing may optionally be formed from stainless steel, and may include radiation shielding that encloses one or more of the image sensor and the first SERDES.

In another aspect of the invention, a camera system is provided for use in a hazardous underwater environment, where the camera system includes a camera assembly comprising a housing having a watertight seal, an image sensor disposed within the housing, the image sensor adapted for generating a digital signal corresponding to an image of an object located within the underwater environment, and a first serializer/deserializer (SERDES) disposed within the housing for converting the signal from the image sensor into a serial bit stream; a transmission medium for transmitting the serial bit stream; and an image processing module located away from the hazardous underwater environment for receiving the transmitted serial bit stream, the image processing module comprising a second SERDES adapted for deserializing the serial bit stream to generate a decoded image signal, and an image processor adapted to process the decoded image signal to generate an output at a display device corresponding to the image of the object. In one embodiment, the housing is formed from stainless steel and may include radiation shielding enclosing one or more of the image sensor and the first SERDES. The camera system may further include a robotic delivery system responsive to a controller located away from the hazardous underwater environment.

In one embodiment, the sensor is a CMOS Image Sensor. For nuclear reactor inspection applications, the image sensor is preferably radiation hardened to operate without significant signal degradation up to 2 MRad TID (total integrated dose). Other types of sensors, including CCD and CID, may be used as long as the sensor produces a digital bit stream that is provided to the SERDES for transmission to the processing module. The sensor and SERDES may be enclosed within a watertight housing that is suitable for operation in water. For nuclear reactor applications, the material used for the housing is preferably stainless steel. Some level of radiation shielding may be included in the housing with a trade-off between size versus camera life, since the more shielding that is used, the larger the camera head will be. In one embodiment, the sensor itself may be unshielded, while the SERDES chip and associated components may be shielded. Since it is a significant advantage of the inventive system to provide a very small camera head that can be used to inspect tight spaces, increasing the dimensions of the camera head by adding shielding should be considered carefully.

In one embodiment, the camera housing may be mounted on a robotic delivery system that is remotely controlled from the processing module. (Note that control signals for the robot may also be carried over the high frequency cable.) A watertight connector or penetrator provides connection to a high frequency (e.g., microwave or faster) cable. Strain relief should preferably be provided to avoid damaging or stressing the cable when the robot moves. The cable may be on the order of 15 meters (50 feet) or longer to provide sufficient isolation from the radiation source. The processing module may be housed within a workstation with data storage for storing the collected video (both raw and processed) and a user interface such as a monitor or other graphic display that allows the operator to observe in real time and to control movement of the robot to inspect the area of interest.

While significant advantage is gained through use of the present invention for visual inspection of nuclear reaction, the invention is not intended to be limited to such applications. The principles of the invention are applicable to other sensor types and different environmental situations. Such other uses for the system described herein will become apparent to those of skill in the art.

DETAILED DESCRIPTION

Figure 1:
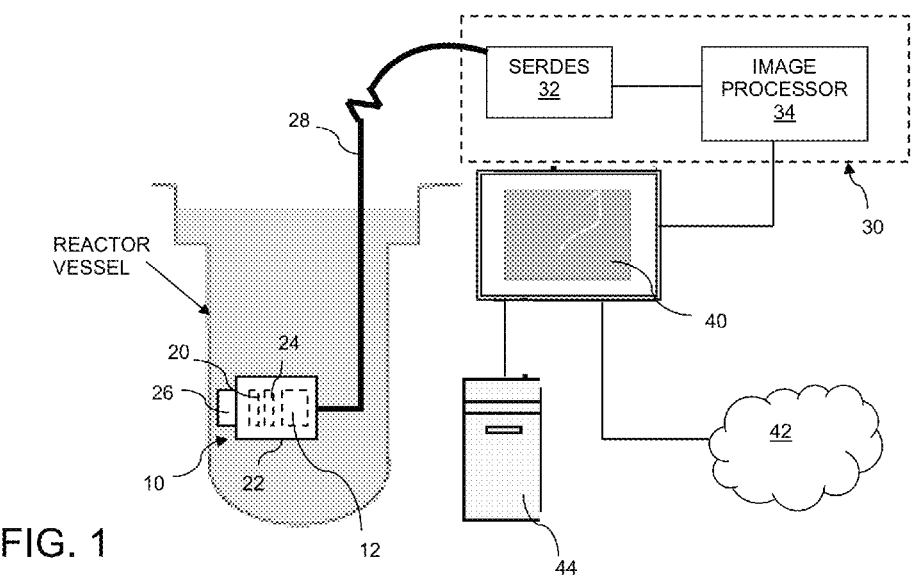
FIG. 1 is a block diagram of an exemplary system for visual inspection of a nuclear reactor vessel.
Figure 2:
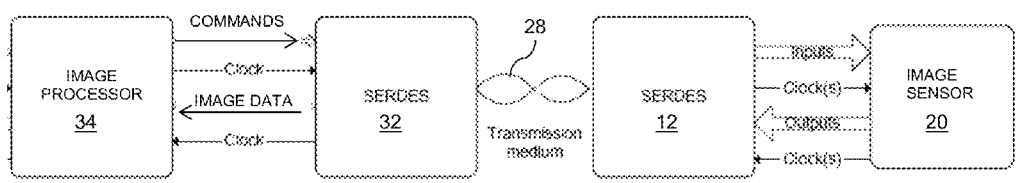
FIG. 2 is a block diagram of the sensor and processor.

As illustrated in FIGS. 1 and 2, the camera 10 for visual inspection comprises an image sensor 20 for producing a digital signal corresponding to detected images, where the camera comprises a housing 22 for supporting lenses and/or windows 26 along with appropriate driver electronics 24 and a serializer-deserializer (SERDES) encoder/decoder 12. The SERDES converts the signal from the sensor into a high frequency bit stream that can be communicated through an appropriate connector to a high frequency cable 28, e.g., a microwave or faster cable, to a processing module 30 in which a second SERDES 32 receives the high frequency signal and resolves the incoming bit stream into a digital bit stream for processing of the image by image processor 34. The use of a SERDES encoder/decoder pair, one at the sensor end and one at the processing module 30 permits high speed transmission of data from the sensor to the processing module 30 and control commands from the processing module to the sensor.

In one embodiment, the sensor 20 is a CMOS Image Sensor. For nuclear reactor inspection applications, the image sensor is preferably radiation hardened to operate without significant signal degradation up to 2 MRad TID (total integrated dose). Other types of sensors, including CCD and CID, may be used as long as the sensor is capable of producing a digital signal that can be provided to the SERDES 12 for high frequency transmission to the processing module 30. In the preferred embodiment, the sensor is a radiation hardened color sensor. In other embodiments, the sensor may be a radiation hardened monochrome sensor with the image color being generated during image processing based on different color LEDs that are placed on or in the camera. While such an approach tends to insert delays into image processing when used in prior art systems, the impact is reduced in the present invention due to the high frequency data transmission made possible by the use of SERDES encoders/decoders. The sensor and camera SERDES 12 may be enclosed within a watertight housing 22 that is suitable for operation in water. For nuclear reactor applications, the material used for the housing is preferably stainless steel. Some level of radiation shielding may be included in the housing 22 by trading off size versus camera life, since the more shielding that is used, the larger the camera head will be. In one embodiment, the sensor 20 may actually be unshielded, while the SERDES chip 12 and associated components 24 may be shielded. Since it is a significant advantage of the inventive system to provide a very small camera head that can be easily maneuvered to inspect tight spaces, increasing the dimensions of the camera head by adding shielding should be considered carefully.

The camera 10 may be mounted on a robotic delivery system that is remotely controlled through the processing module 30 either through an automated routine or through an operator control device such as a joystick, trackball or touchpad. (Note that control signals for the robot may also be carried over the high frequency cable 28.) The robotic system may be as simple as multi-axis rail-based system, a multi-axis articulated arm, or a free-moving robotic system, all remotely controllable from a location outside of the hazardous environment. One example of such a robotic system is disclosed in U.S. application Ser. No. 13/453,237, which is incorporated herein by reference.

A watertight connector or penetrator provides connection of the camera 10 to the high frequency cable 28. Strain relief should preferably be provided to avoid damaging or stressing the cable when the robot moves. The cable 28 may be on the order of 15 meters (50 feet) or longer to provide sufficient isolation of the processing module 30 from the radiation source. In some environments, where appropriate, high frequency wireless communication means may be used to facilitate unrestricted movement of a free-moving robot.

The processing module 30 may be housed within a workstation located on-site outside of and at a safe distance from the high-radiation or other hazardous environment. The workstation may include or be connected to a data storage unit for storing the collected video (both raw and processed) and a user interface such as a monitor or other graphic display that allows the operator to observe in real time and to control movement of the robot to inspect desired area. In the illustrated example, the processed image may be displayed at a graphical user interface 40 which may be incorporated into the on-site workstation. Additional monitoring capability may be provided by way of a network connection 42, for example, a local area network (LAN), wide area network (WAN), or any other network connection as is known in the art, including the worldwide web (WWW), to a remote monitoring station. Raw and processed images may be saved in one or more data storage devices 44, which may be physically located near the inspection station and/or at some remote location.

The use of SERDES encoder/decoders 12 and 32 is a key component of the invention in allowing high speed communication of the signal generated by the sensor 20 to the processing module 30. The high speed communication provides for very high speed transfer of image data to a remotely-located processor, thus allowing radiation-sensitive electronics components to be isolated from the high-radiation environment. The inventive system permits real time viewing of the area under inspection, taking advantage of the superior resolution of digital imaging devices and high speed data transfer, to provide a significant improvement over the existing systems.

The following principles were employed in determining the arrangement of the system components:

Electronic assemblies that operate in harsh environments tend be expensive. The greater the component count, the greater the cost and the greater the likelihood of failure. Testing IC's which are intended for operation in harsh environments can be costly and uncertain when the support electronics is subject to the same stresses as the unit under test (UUT). To the extent the IC which must be subjected to stress can be isolated, system cost can be reduced and reliability improved; assurance in test is also improved.

Figure 3:
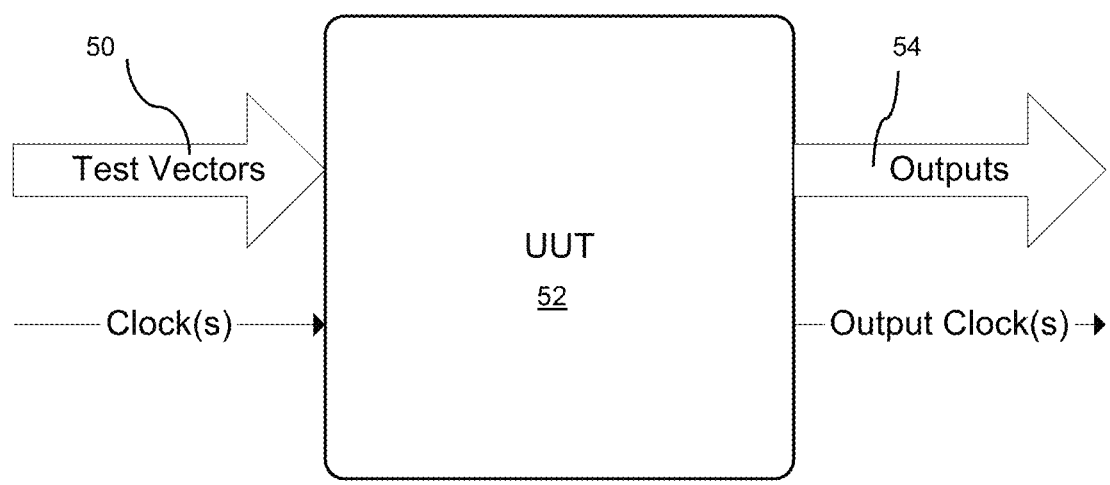
FIG. 3 is a block diagram of an integrated circuit verification process.

The conventional method of testing digital integrated circuits (IC's), illustrated in FIG. 3, is by generating test vectors 50 to stimulate the devices 52 and verifying the resulting outputs 54. This method is first used in simulation where the device model is commonly referred to as the "unit under test" ("UUT"). Typically the part is modeled—actually developed—using hardware description language (HDL). The resulting model is subjected to register level transfer (RTL) verification and its operation characterized. Subsequent to RTL level verification, process specific device models are used to perform timing simulation prior to the process commonly referred to as "tape out" of the new IC. "Tape out" is the production of the first prototype wafer lots. These wafer lots are then tested with the same set of test vectors, used in testing of the original device models, to characterize the actual components.

One application in which failure of electronic components is particularly of concern is high radiation environments, such as nuclear reactors. Electronic devices such as sensors, cameras and safety equipment must be radiation hardened to ensure reliable performance. Schwank, et al. provide an overview of radiation hardness testing of microelectronic devices and ICs in "Radiation hardness Assurance Testing of Microelectronic Devices and Integrated Circuits: Radiation Environments, Physical Mechanisms, and Foundations for Hardness Assurance", Sandia National Laboratories Documents SAND-2008-6851P, which is incorporated herein by reference.

Figure 4:
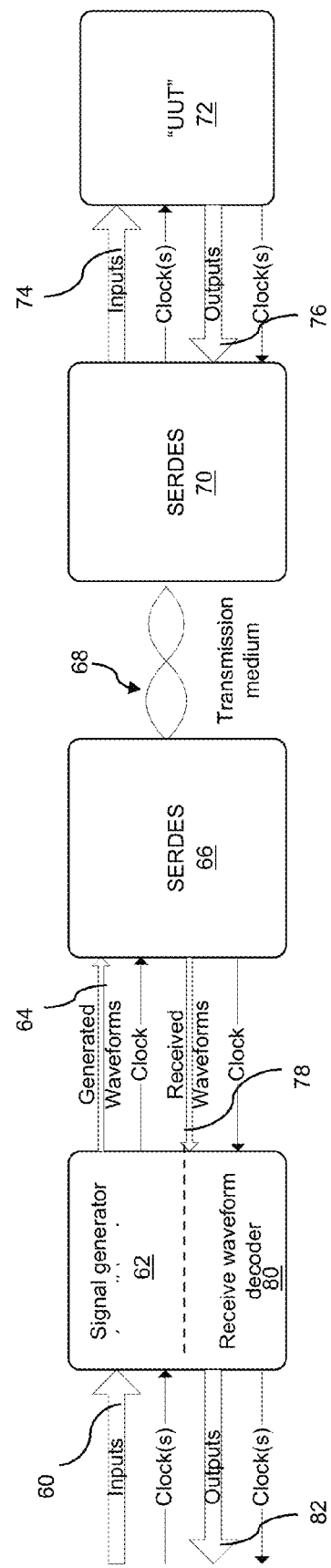
FIG. 4 is a block diagram showing remote in-system operation.

FIG. 4 illustrates a method of operating an IC 72 remotely in a manner that allows it to perform most or all of the same functions that it would perform if it were a part of a single circuit card assembly (CCA) according to standard testing methods. The input signals 60 to be used for testing are input into the test waveform generator 62, such as a micro-sequencer or a gate array, which produces the test waveforms 64. The test waveforms are input into SERDES 66 for encoding of the waveforms into serial bits for high frequency transmission. The encoded signal is communicated via transmission medium 68, which can be any conventional communication medium including optical, wired or wireless, to SERDES 70, which decodes the encoded waveforms to provide inputs 74 for testing the UUT, i.e., IC 72. The responses 76 produced by IC 72 are converted by SERDES 70 into a high frequency bit stream for transmission over medium 68 to SERDES 66. The encoded signal is deserialized by SERDES 66 to produce the received waveforms 78 corresponding to the responses of the IC 72 to the test waveforms. The received waveforms are decoded at decoder 80 to generate an output signal 82. As is known in the art, appropriate clock signals must be provided to each device to enable encoding and decoding.

Features of the described testing scheme include:
1. Use of the characterization of the UUT to produce operational drive waveforms the results of which can be decoded and used by the receiver in an inherently "error-free" or usable manner as though the UUT were local to system;
2. Minimization of part count in the assembly that is exposed to the harsh environment for improved reliability and reduced cost;
3. Use of the serialization and transmission for synchronous control signals and not only payload data as is the practice in conventional testing methods.

Figure 5:
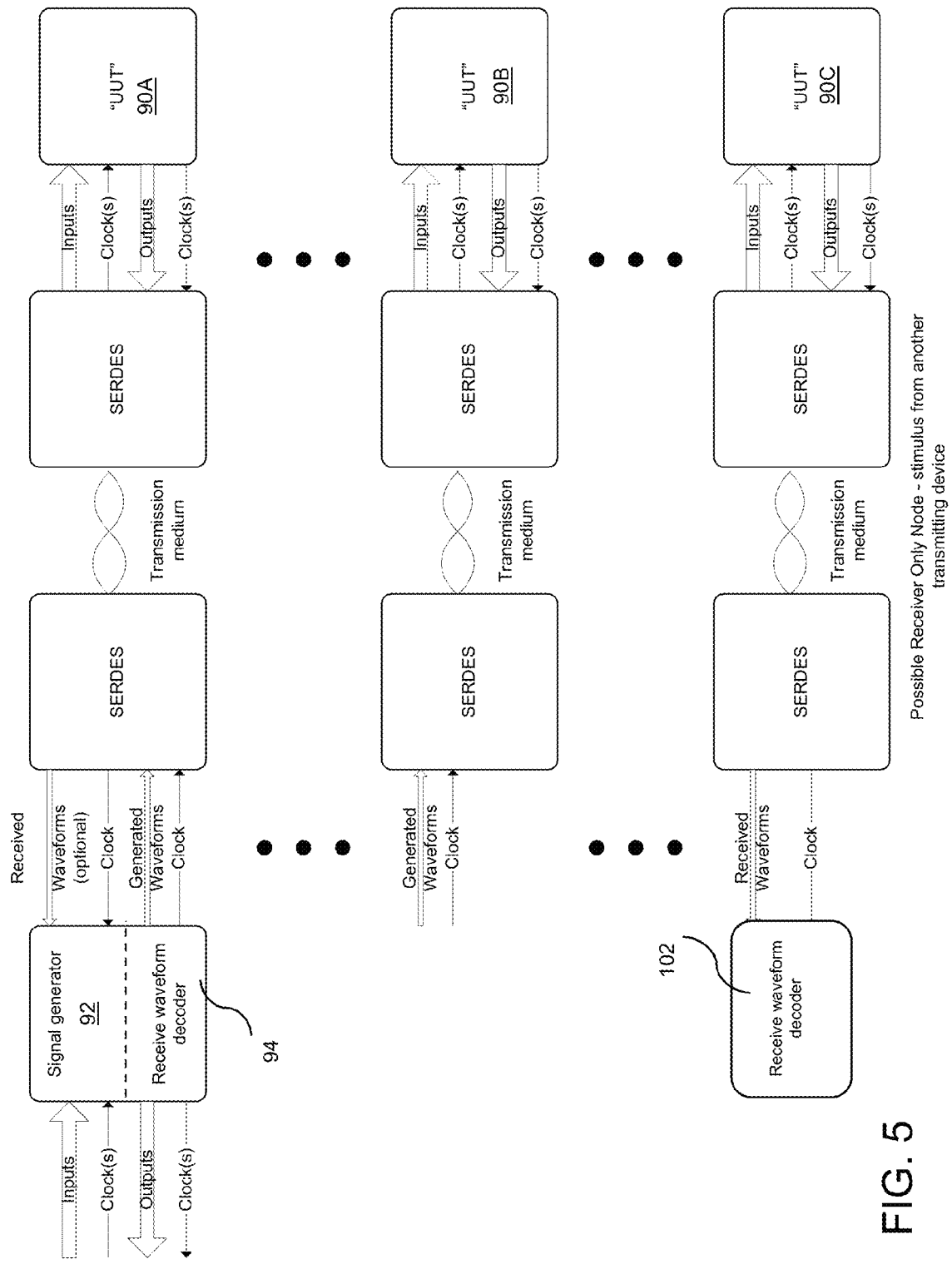
FIG. 5 is a block diagram of the present invention showing multiple node architecture.

This testing scheme can be expanded so that the source driving electronics can be used to drive multiple ICs 90A, 90B, 90C to be tested (UUTs). One possible example is shown in FIG. 5, where the UUTs can send data to multiple receive waveform decoders (RWDs), e.g., RWD 94 and RWD 102, where RWD 102 is remote from the transmit waveform generator (TWG) 92 or principal node.

The isolation of sensitive electronic components from hazardous environmental conditions is an important aspect of the invention. While significant advantage is gained through use of the present invention for visual inspection of nuclear reaction, the invention is not intended to be limited to such applications. The principles of the invention are applicable to other sensor types and different environmental situations. Such other uses for the system described herein will become apparent to those of skill in the art.

The invention claimed is:

1. A camera system for use in a high-radiation environment, comprising:
    a camera assembly comprising:
        a housing;
        a radiation-hardened image sensor disposed within the housing, the image sensor adapted for generating a digital signal corresponding to a detected image of an object located within the high-radiation environment; and
        a first serializer/deserializer (SERDES) disposed within the housing for converting the signal from the image sensor into a serial bit stream;
    a transmission cable connected at a first end to the camera assembly, the transmission cable configured for transmitting the serial bit stream at a high frequency, the transmission cable having a cable length of 15 meters or longer; and
    an image processing module disposed outside of the high-radiation environment for receiving the transmitted serial bit stream at a second end of the transmission cable, the image processing module comprising:
        a second SERDES adapted for deserializing the serial bit stream to generate a decoded image signal; and
        an image processor adapted to process the decoded image signal to generate an output at a display device corresponding to the detected image.

2. The camera system of claim 1, wherein the housing comprises a seal for enclosing the image sensor and the first SERDES in a watertight enclosure.

3. The camera system of claim 1, wherein the housing is formed from stainless steel.

4. The camera system of claim 1, wherein the housing comprises radiation shielding enclosing the first SERDES.

5. The camera system of claim 1, wherein the display device is incorporated within an inspection workstation and wherein the inspection workstation comprises a controller for controlling operation of the camera assembly.

6. The camera system of claim 5, further comprising a robotic delivery system responsive to the controller.

7. The camera system of claim 1, wherein the image sensor comprises a CMOS sensor.

8. The camera system of claim 1, wherein the image sensor is a color image sensor.

9. The camera system of claim 1, wherein the transmission cable transmits at microwave or higher frequency.

10. The camera system of claim 1, wherein the image sensor is a monochrome sensor and the image processor is configured to convert a monochrome image into a color image.

11. A camera system for use in a hazardous underwater environment, comprising:
    a camera assembly comprising:
        a housing having a watertight seal;
        a radiation-hardened image sensor disposed within the housing, the image sensor adapted for generating a digital signal corresponding to an image of an object located within the underwater environment; and
        a first serializer/deserializer (SERDES) disposed within the housing for converting the signal from the image sensor into a serial bit stream;
    a transmission cable connected at a first end to the camera assembly, the transmission cable configured for transmitting the serial bit stream at a microwave or higher frequency, the transmission cable having a cable length of 15 meters or longer; and
    an image processing module disposed outside of the hazardous underwater environment for receiving the transmitted serial bit stream, the image processing module comprising:
        a second SERDES adapted for deserializing the serial bit stream to generate a decoded image signal; and
        an image processor adapted to process the decoded image signal to generate an output at a display device corresponding to the image of the object.

12. The camera system of claim 11, wherein the housing is formed from stainless steel.

13. The camera system of claim 11, wherein the housing comprises radiation shielding enclosing the first SERDES.

14. The camera system of claim 11, wherein the display device is incorporated within an inspection workstation and wherein the inspection workstation comprises a controller for controlling operation of the camera assembly.

15. The camera system of claim 14, further comprising a robotic delivery system responsive to the controller.

16. The camera system of claim 11, wherein the image sensor comprises a CMOS sensor.

17. The camera system of claim 11, wherein the image sensor is a color image sensor.

18. The camera system of claim 11, wherein the image sensor is a monochrome sensor and the image processor is configured to convert a monochrome image into a color image.

19. A visual inspection system for a high-radiation environment, the system comprising:
    a camera assembly comprising an unshielded radiation-hardened image sensor disposed within a sealed housing, the image sensor configured for generating image data corresponding to one or more objects of interest within the high-radiation environment;
    a transmission cable connected to the camera assembly, the transmission cable configured for transmitting data at microwave or higher frequency, the transmission cable having a second end extending outside of the high-radiation environment;
    an image processing module disposed outside of the high-radiation environment, connected to the transmission cable for receiving the transmitted data, the image processing module comprising an image processor adapted to process an image signal to generate an output at a display device corresponding to images of the one or more objects of interest; and
    a SERDES pair comprising a first SERDES disposed within the camera assembly, the first SERDES configured for serializing image data to generate a serial bit stream for transmission across the transmission cable, and a second SERDES disposed within the image processing module, the second SERDES configured for deserializing the serial bit stream for input to the image processor.

20. The visual inspection system of claim 19, wherein the camera assembly further comprises radiation shielding enclosing the first SERDES.

21. The visual inspection system of claim 19, wherein the display device is incorporated within an inspection workstation and wherein the inspection workstation comprises a controller for controlling operation of the camera assembly.

22. The visual inspection system of claim 21, further comprising a robotic delivery system responsive to the controller.

23. The visual inspection system of claim 19, wherein the image sensor comprises a CMOS sensor.

24. The visual inspection system of claim 19, wherein the image sensor is a color sensor.

25. The visual inspection system of claim 19, wherein the image sensor is a monochrome sensor and the image processor is configured to convert a monochrome image into a color image.

\* \* \* \* \*